United States Patent [19]

Butler

[11] 4,301,699
[45] Nov. 24, 1981

[54] DRILL ACTUATING MECHANISM

[76] Inventor: Roy F. Butler, 1008 B. Vista del Cerro, Tempe, Ariz. 85281

[21] Appl. No.: 110,678

[22] Filed: Jan. 9, 1980

[51] Int. Cl.³ .................. B23B 3/36; B23B 39/05; B23B 5/26
[52] U.S. Cl. .................... 82/34 R; 408/99; 409/185; 409/144; 409/204
[58] Field of Search .............. 82/34 R, 21 R; 408/99; 409/185, 204, 215, 144; 29/57

[56] References Cited

U.S. PATENT DOCUMENTS

| | | | |
|---|---|---|---|
| 1,397,696 | 11/1921 | Nelson | 409/144 |
| 1,704,957 | 3/1929 | Tyden | 29/57 |
| 2,642,760 | 6/1953 | Goldberg | 408/99 |
| 2,712,273 | 7/1955 | Rushok | 409/185 |
| 2,925,001 | 2/1960 | Johnson | 408/99 |
| 3,258,997 | 7/1966 | Krisovitch | 82/34 |

OTHER PUBLICATIONS

Sales Brochure-H. C. Stanley Co.-Micro Production Drilling Head.

*Primary Examiner*—Harrison L. Hinson
*Attorney, Agent, or Firm*—Don J. Flickinger

[57] ABSTRACT

A link is pivotally connected at one end to the collar which is clampingly engaged with the quill of a machine tool. The other end of the link is pivotally connected to one end of a lever arm. At an intermediate point, the lever arm is engagable with a conventional sensitive drill adapter held in accordance with conventional practice by the machine tool. The drill adapter is reciprocally movable in response to movement of the lever arm.

2 Claims, 5 Drawing Figures

DRILL ACTUATING MECHANISM

BACKGROUND OF THE INVENTION

1. Field of the Invention

This invention relates to machine tools.

In a further aspect, the present invention relates to attachments for machine tools.

More particularly, the instant invention concerns a drill actuating mechanism especially adapted for sensitive drilling operations in machine tools.

2. Description of the Prior Art

Various machine tools, including drill presses, milling machines and lathes, are frequently used to perform drilling operations. Commonly, each of the instant type of machine tools includes means for supporting a work piece and means for holding the shank of a boring tool, such as a twist drill. Rotation is imparted to either the work piece or the boring tool. Further, the machine tool includes means for axial reciprocal movement of the boring tool relative the work piece.

In a drill press, the machine tool especially devised for conducting drilling operations, the work piece is supported upon a table. Positioned above the table, and usually perpendicular thereto, is a reciprocally movable cylindrical element referred to as a quill. Carried within the quill is a spindle which is rotatably driven by a motor. Provided at the lower end of the spindle are means for holding the shank of a twist drill or other boring tool such as a counterbore or countersink. Typically, the means for holding the boring tool is in the form of a drill chuck. In accordance with conventional practice, the quill is reciprocally moved by a rack-and-pinion mechanism in response to an operator manipulated handle.

A milling machine, in general similarity to a drill press, typically includes a horizontal work supporting table and an upright quill. The spindle is generally provided with a collet arrangement for holding the shanks of various cutting tools. On occasion, twist drills are held directly by the collet. More frequently, however, twist drills are held by a drill chuck, the shank of which is held by the collet.

While the method of drilling in a lathe is substantially equivalent to the procedure involving a drill press or milling machine, the components are somewhat different. The work piece is generally held and rotated by a face plate or chuck carried by a horizontal spindle within a headstock affixed to one end of an elongate bed. A tailstock, slidably along the bed, carries a reciprocally movable quill. A drill chuck is attachable to the quill for purposes of performing drilling operations.

The drilling operations performed in various machine tools are generally analogous. During relative rotation between the drill and the work piece, the drill is moved axially with controlled pressure to enter the work piece. The rate which the drill moves is termed the rate of feed. A cutting lubricant is usually applied to the drill during the cutting operation. Periodically the drill is withdrawn from the hole being bored for the purpose of removing chips and also for the further application of cutting lubricant.

The effort or force exerted by a machine tool operator to feed a drill is variably dependent upon the size of drill and the hardness of the material of the work piece. In general, the larger the drill and the harder the material, the greater the force required. Conversely, relatively little effort is required to urge a comparatively small drill into soft material. Machine tool operators subjectively judge the proper note of feed by the traditional and familiar method known in the art as "feel".

In addition to the force required to urge the drill into the work piece, the operator of a machine tool is required to exert additional force to impart movement to the massive components of the machine and overcome internal friction. Accordingly, machine tools have not proven to be entirely satisfactory for all drilling operations. This is especially acute in situations involving relatively small drills and further complicated by comparatively hard materials. The "feel" of the drill is lost. That is, the force required by the drill is negligible and cannot be distinguished by the operator in comparison to the force required to move the components of the machine. Resultingly, small drills are frequently broken and holes thus drilled are not true.

In recognition thereof, the prior art has provided sensitive adapters for use in machine tools for the express purpose of drilling small holes. A small hole is loosely defined as one made by a drill in the number size range, 0.0135 inch to 0.228 inch. Exemplary is the sensitive precision drill adapter distributed by the H. C. Stanley Company. The device includes a stem coaxially, slidably mounted within a sleeve. At the free end of the stem, extending from the sleeve, is a chuck especially adapted for holding small drills. A feed ring in the form of a collar is rotatably journaled on the stem intermediate the chuck and the sleeve. The drill chuck has a variable capacity of 0.000 inch to 0.156 inch.

During use, the sleeve is held within the chucking means, large drill chuck or collet, of the selected machine tool. The operator manipulates the drill by manually holding the feed ring. It is noted that the stem is not rotatable relative the sleeve. Accordingly, the operator is not concerned with the internal friction nor mass of the machine tool. During the drilling of small holes, it is preferred method among those skilled in the art that the operation is performed with numerous successive reciprocal movements. During each inward movement, the drill is advanced into the material a relatively small amount, perhaps as much as a few thousandths. During withdrawal, chips are removed from the drill and lubrication is applied thereto.

Drill adapters of the foregoing type, while nullifying the internal friction and weight of the machine tool, have not presented an entirely satisfactory solution to the problem of drilling small holes. Considerable operator pressure must be applied for drilling holes larger than approximately one-half of the capacity of such adapters. Manipulating the relatively small feed ring has proven to be a cumbersome and tiring procedure. Further, difficulty is encountered during drilling operations which require rapid or repeated reciprocal movement of the drill. Other shortcomings will be apparent to those skilled in the art.

Accordingly, it is an object of the present invention to provide improved means for drilling small holes.

Another object of the invention is the provision of a sensitive drill actuating mechanism.

And another object of the invention is to provide an attachment which is readily usable with various machine tools.

Still another object of this invention is the provision of improved means for actuating a conventional sensitive drill adaptor.

Yet another object of the invention is to provide means for decreasing the effort required when utilizing drills in the larger range of the capacity of drill adapters.

And still a further object of the invention is the provision of a drill actuating mechanism which is detachably securable to the machine tool and the drill adapter.

A further object of the instant invention is to provide a drill actuating mechanism which will easily facilitate rapid and repeated reciprocal movement of the drill.

And a further object of the invention is the provision of a device which is easily usable and will substantially reduce operator fatigue.

And still a further object of the invention is to provide a sensitive drill actuating mechanism which will not interfere with the operator's feel of the drill.

And still a further object of the invention is the provision of a device of the above type which is free of delicate components and relatively durable.

SUMMARY OF THE INVENTION

The foregoing and further and more specific objects and advantages of the instant invention will become readily apparent to those skilled in the art from the following detailed description of a preferred embodiment thereof taken in conjunction with the drawings, in which.

Briefly, to achieve the objects of the instant invention, in accordance with a preferred embodiment thereof, provided is a sensitive drill actuating mechanism for use in combination with a machine tool and a drill adapter held thereby. The drill actuating mechanism includes attachment means detachably securable to the machine tool and lever means movably coupled to the attachment means. The lever means are engagable with the drill adapter for movement of the drill adapter in response to movement of the lever arm.

More specifically, the attachment means includes a collar for encircling the quill of the machine tool. An adjustable element, such as a set screw, clampably and removably secures the collar to the quill. The lever means includes means for detachably engaging the drill adapter and a lever arm extending therefrom. A link is pivotally secured at one end to the collar and at the other end to the drill adapter engaging means.

DESCRIPTION OF THE PREFERRED EMBODIMENTS

Figure 1:
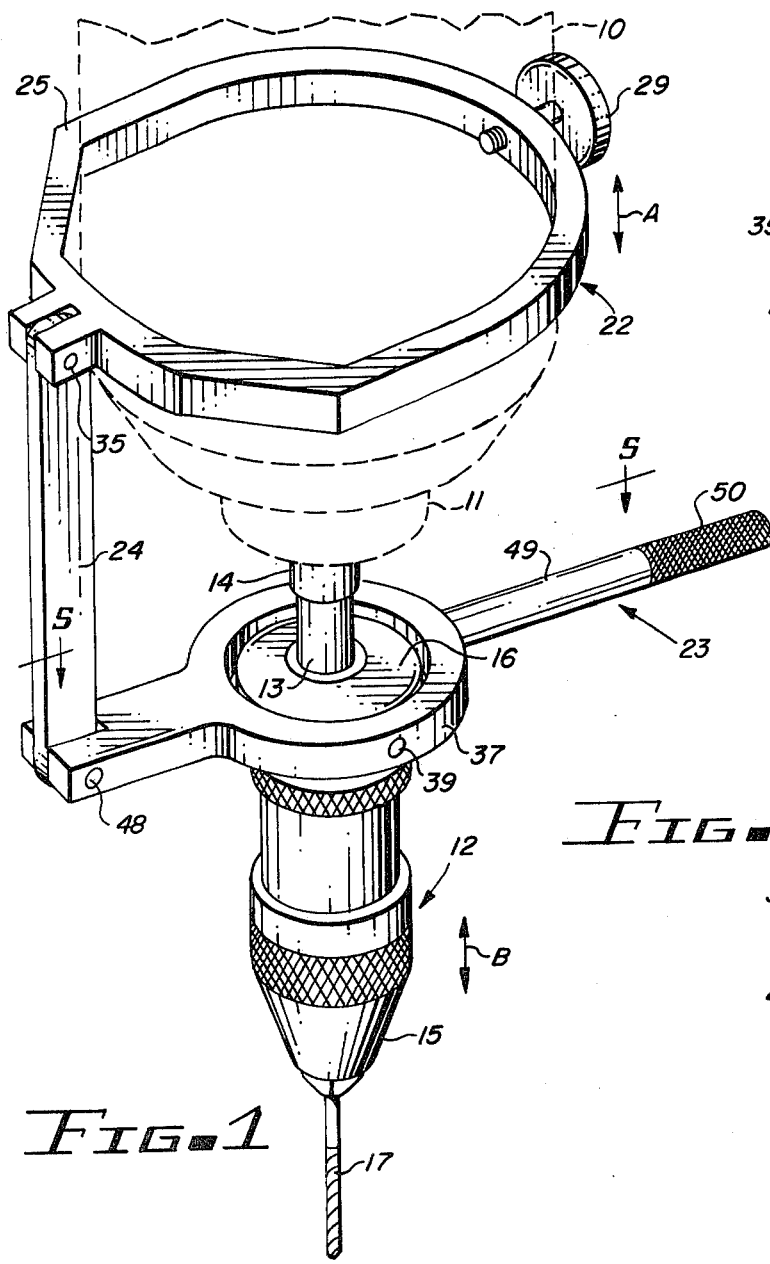
FIG. 1 is a perspective view of a drill actuating mechanism constructed in accordance with the teachings of the instant invention as it would appear during use in combination with a machine tool, the relevant portion of a machine tool being shown in broken outline, and with a typical commercially available sensitive drill adapter.

Turning now to the drawings in which like reference characters indicate corresponding elements throughout the several views, attention is first directed to FIG. 1 which illustrates, in broken outline, a portion of a conventional machine tool including quill 10 and spindle 11. Quill 10, being nonrotatable and reciprocally movable in the directions indicated by the double arrowed line A in response to an operator manipulated handle. Spindle 11, rotatably journaled within quill 10, is power driven, usually by an electric motor.

Chucking means, for holding the shank of a twist drill or other boring or cutting tools, is carried by spindle 11. Although not specifically seen in the immediate illustration due to the angle thereof, spindle 11 is provided with a collet. Other chucking means, such as a drill chuck, may be held directly by the spindle or in turn by a collet.

The vertically oriented quill and spindle arrangement depicted is typical of various machine tools such as drill presses and milling machines. Certain other machine tools, such as lathes, have a horizontally oriented quill. Since the work piece is rotated, the quill does not include a spindle and the chucking means is carried directly by the quill.

Quill 10 and spindle 11 are set forth for purposes of environment and orientation with respect to the instant invention. Further and more specific details of machine tools of the instant type, which can be used for drilling operations, are well known to those skilled in the art.

Those skilled in the art are also familiar with sensitive drill adapters. Such devices are held by the chucking means of a machine tool especially for the purpose of adapting the machine tool for use with drills in a size range smaller than the normal size range of the machine tool. A drill adapter, generally designated by the reference character 12 and typical of such prior art devices, is also illustrated in FIG. 1. Drill adapter 12 includes stem 13 having cylindrical sleeve 14 at one end thereof. Drill chuck 15, normally having a capacity in the number drill size range, is affixed to the free end of stem 13. Finger ring 16 is rotatably affixed to stem 13 intermediate sleeve 14 and chuck 15. A conventional twist drill 17 is held by and projects from chuck 15.

In use, sleeve 14 is held by the collet or other chucking means and rotated with spindle 11. Rotation of sleeve 14 is imparted to chuck 15 through stem 13. Finger ring 16, although rotatable, is axially fixed. Accordingly, the operator generally grasps finger ring 16 between thumb and forefinger to manually reciprocally move drill 17 in directions indicated by the double arrowed line B.

The embodiment illustrated in FIG. 1, shows a drill actuating mechanism of the instant invention as broadly including attachment means, generally designated by the reference character 22, for detachably securement to a machine tool and lever means, generally designated by the reference character 23, for engagement with a drill adapter. Attachment means 22 and lever means 23 are movably coupled by link 24. The drill adapter is movable in response to movement of lever means 23, as will be hereinafter described in further detail.

Figures 4, 5:
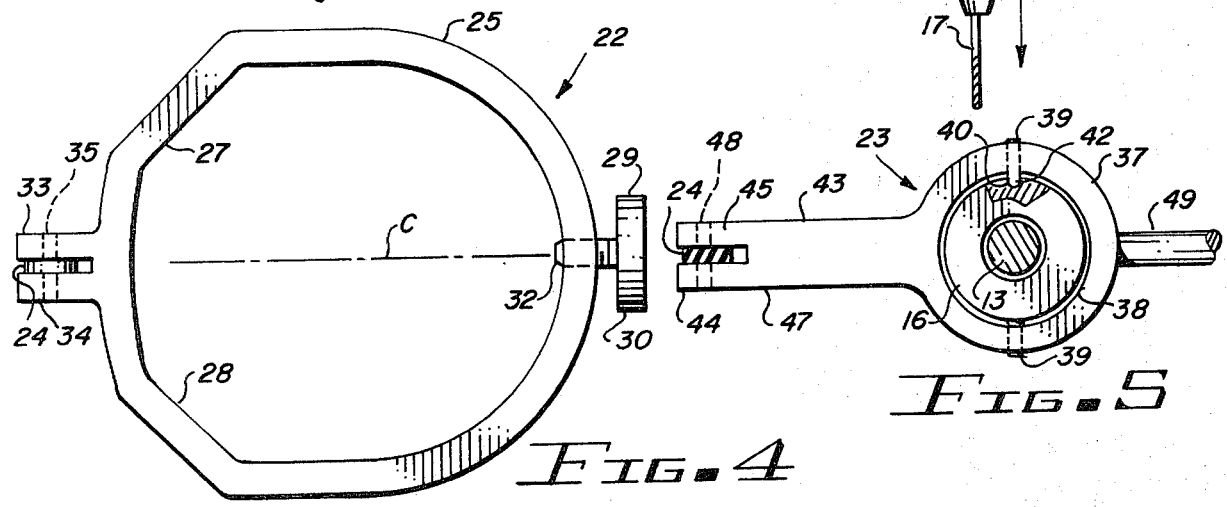
FIG. 4 is a plan view of that portion of the instant invention which is attachable to a machine tool.
FIG. 5 is a horizontal sectional view taken along the line 5—5 of FIG. 1.

Attachment means 22, as further illustrated in FIG. 4, includes an endless member or collar 25 which is sized to encircle quill 10. While collar 25 may be of any desired general shape, the preferred and illustrated embodiment includes two angularly disposed straight sections 27 and 28. Although the specific angle between sections 27 and 28 is relatively unimportant, an angle of approximately 90° has proven to provide satisfactory results. The bisector of the angle between sections 27 and 28 is illustrated by the broken line C. Accordingly, when collar 25 is placed about quill 10, a point on each section 27 and 28 contacts quill 10. The center of cylindrical quill 10 lies along line C. The use of two point contact, provided by a pair of angularly disposed straight sections, to align upon a cylindrical surface is well known to those skilled in the art.

Collar 25 is removably secured to quill 10 by an adjustable element specifically illustrated as thumb screw 29 having knurled head 30 and threaded shank 32. In accordance with conventional practice, thumb screw 29 is thready engaged with collar 25. The axis of shank 32 is coincident with broken line C. When thumb screw 29 is tightened against quill 10, the quill is clamped between the respective points on sections 27 and 28 and shank 32. Bifurcated connection means represented by furcations 33 and 34 project from collar 25 in diametrically opposed alignment with shank 32 of thumb screw 29. Furcations 33 and 34 are spaced apart to receive link 24 therebetween. One end of link 24 is pivotally secured to collar 25 by pin 35 extending concurrently through furcations 33 and 34 and link 24. Accordingly, link 24 depending from collar 25 lies in a plane which passes through the axis of quill 10 and the axis of rotation of drill adapter 12.

The lever means 23, as further illustrated in FIG. 5, includes an enlarged central section 37 having an opening 38 therethrough sized to loosely receive finger ring 16 of drill adapter 12. A pair of diametrically opposed pivot elements 39 extend through central section 37 into opening 38. Preferably, each pivot element 39 is in the form of a set screw threadedly engaged within section 37 and terminates with an inwardly directed conical point 40. The conical point 40 of each pivot element 39 is received within a respective mating indentation 42 formed in finger ring 16. Central section 37 together with opening 38 and pivot elements 39 comprise engagement means for detachably securing lever means 23 to drill adapter 12.

Elongate element 43 extending from central section 37 terminates with bifurcated free end 44 having spaced apart furcations 45 and 47. The spacing between furcations 45 and 47 is sufficient to receive link 24 therebetween. Similar to the arrangement previously described involving one end of link 24 and furcations 33 and 34, pin 48 extends concurrently through furcations 45 and 47 and the other end of link 24 for pivotally connecting link 24 lever means 23. Lever arm 49 extending from central section 37 in a direction diametrically opposed to elongate element 43, terminated with knurled portion 50.

The immediate embodiment of the invention requires slight modification of drill adapter 12. The modification, which is readily and conveniently accomplished by those having need for the device of the instant invention, is limited to the formation of a pair of diametrically opposed conical indentations in finger ring 16. In preparation for use, drill adapter 12 is engaged with the selected machine tool in accordance with conventional pre-established practice. Collar 25 is then positioned around the lower end of quill 10 and clampingly secured thereto by thumb screw 29. Finally, finger ring 16 is positioned within opening 38 and pivot elements 39 are rotated to enter conical indentations 40.

Figure 2:
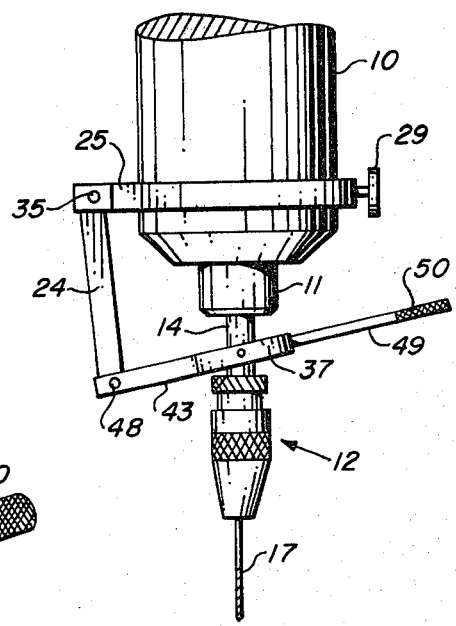
FIG. 2 is an elevation view of the assembly of FIG. 1 as it would appear in preparation for use.
Figure 3:
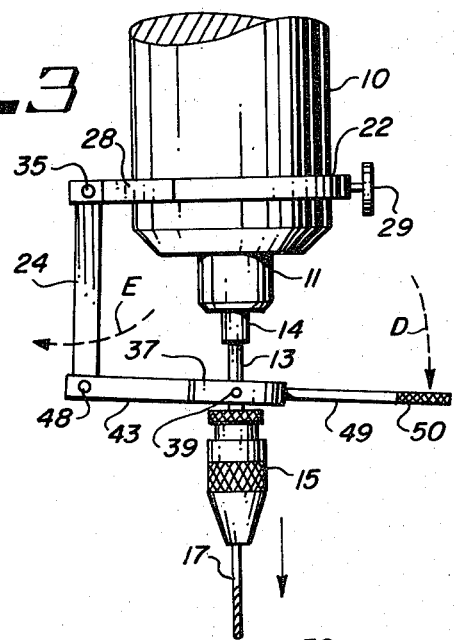
FIG. 3 is an elevation view corresponding to the illustration of FIG. 2 and especially showing the movement of the components thereof during operation.

The established function of drill adapter 12 is not altered during use of the drill actuating mechanism of the instant invention. Prior to performance of the drill operation, the machine tool operator applying upward pressure upon lever arm 49 moves drill 17 upwardly in the position specifically illustrated in FIG. 2. It is particularly noted that in this position knurled end 50 of lever arm 49 is displaced upwardly from the horizontal pivoting central section 37 about finger ring 16 and drilling the free end of elongate element 43 as represented by pin 48 inwardly toward drill adapter 12. Link 24 pivots about pin 48 and pin 35 to accommodate this movement without binding among the several components.

During the drilling operation, drill 17 is brought into contact with the work piece in response to movement of lever arm 49 in the direction of arrowed line D. This accomplished with relatively little effort on the part of the machine tool operator such as by grasping knurled section 50 between thumb and forefinger. During downward movement of lever arm 49, stem 13 extends from sleeve 14 and central section 37 pivots about finger ring 16. Concurrently, element 43 pivots about the end of link 24 which in turn pivots relative collar 25 moving in the direction of arrowed line E. Consequently, it will be appreciated that drill adapter 12 functions in the normal manner without binding due to the pivotally linked coupling of the device of the instant invention. Further, lever arm 49 provides an advantage to reduce operator effort, especially during the drilling of larger size holes. Further, it is apparent that use of the device of the instant invention reduces operator fatigue and facilitates rapid and repeated reciprocal movement of drill 17.

Various changes and modifications to the device herein chosen for purposes of illustration will readily occur to those skilled in the art. For example, while it is preferred that the apparatus be constructed of a lightweight metal such as aluminum to minimize operator effort, the device can be fabricated of other selected materials. Similarly, the illustrated shape of the several components are subject to varied discretion. To the extent that such modifications and variations do not depart from the spirit of the invention, they are intended to be included within the scope thereof which is assessed only by a fair interpretation of the following claims.

Having fully described and disclosed the present invention in such clear and concise terms as to enable those skilled in the art to understand and practice the same, the invention claimed is:

1. A drill actuating mechanism for use in combination with a sensitive drill adapter having a rotatably mounted finger ring, and with a machine tool having chucking means for holding said drill adapter, and for reciprocal movement of said drill adapter relative said machine tool, said drilling actuating mechanism comprising:
   a. attachment means detachably securable to said machine tool;
   b. engagement means detachably securable to said drill adapter and including
      i. means defining an opening sized to receive said finger ring therethrough, and
      ii. a pair of diametrically opposed pivot elements extending into said opening and detachably engagable with said finger ring;
   c. connection means extending from said engagement means;
   d. a link having a first pivotal connection with said attachment means and a spaced apart second pivotal connection with said connection means; and
   e. a lever arm extending from said engagement means, said drill adapter being movable in response to movement of said lever arm.

2. The drill actuating mechanism of claim 1, wherein said first and said second pivotal connections are pivotal about respective axes parallel to the axis of said pair of diametrically opposed pivot elements.

* * * * *

UNITED STATES PATENT AND TRADEMARK OFFICE
CERTIFICATE OF CORRECTION

PATENT NO.   : 4,301,699
DATED        : November 24, 1981
INVENTOR(S)  : Roy F. Butler It is certified that error appears in the above—identified patent and that said Letters Patent is hereby corrected as shown below:

In Claim 1, line 6, the word "drilling" should be --drill--.

Signed and Sealed this

Ninth Day of March 1982

[SEAL]

Attest:

Attesting Officer

GERALD J. MOSSINGHOFF

Commissioner of Patents and Trademarks